US008922090B2

(12) United States Patent
Tanaka et al.

(10) Patent No.: US 8,922,090 B2
(45) Date of Patent: Dec. 30, 2014

(54) ROTATING ELECTRICAL MACHINE HAVING SLOTS AT CENTER POSITIONS OF MAGNETIC POLES AND MANUFACTURING METHOD OF THE SAME

(75) Inventors: Yuya Tanaka, Chiyoda-ku (JP); Masafumi Okazaki, Chiyoda-ku (JP); Yuji Takizawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 277 days.

(21) Appl. No.: 13/508,447

(22) PCT Filed: Jan. 20, 2010

(86) PCT No.: PCT/JP2010/050639
§ 371 (c)(1),
(2), (4) Date: May 7, 2012

(87) PCT Pub. No.: WO2011/089695
PCT Pub. Date: Jul. 28, 2011

(65) Prior Publication Data
US 2012/0235533 A1    Sep. 20, 2012

(51) Int. Cl.
*H02K 3/04* (2006.01)
*H01R 39/32* (2006.01)
*H02K 1/22* (2006.01)
*H02K 23/30* (2006.01)

(52) U.S. Cl.
CPC .............. *H02K 23/838* (2013.01); *H02K 23/30* (2013.01)
USPC .............. 310/204; 310/234; 310/264; 29/596

(58) Field of Classification Search
CPC ................................ H02K 23/38; H01R 39/04

USPC .............................. 310/204, 234, 264; 29/596
See application file for complete search history.

(56) References Cited

U.S. PATENT DOCUMENTS

| 2,632,125 | A | * | 3/1953 | Baldwin | 310/204 |
| 6,043,581 | A | * | 3/2000 | Tanaka et al. | 310/197 |
| 2008/0231137 | A1 | * | 9/2008 | Sugishima et al. | 310/197 |

FOREIGN PATENT DOCUMENTS

| JP | 2000-60049 A | 2/2000 |
| JP | 2002-186210 A | 6/2002 |

(Continued)

OTHER PUBLICATIONS

International Search Report for PCT/JP2010/050639 dated Apr. 13, 2010, English Translation.

*Primary Examiner* — Tran Nguyen
*Assistant Examiner* — Jose Gonzalez Quinones
(74) *Attorney, Agent, or Firm* — Sughrue Mion, PLLC

(57) ABSTRACT

A rotating electrical machine having a shaft, an iron core having slots, an armature winding inserted into the slots, a commutator provided to the shaft and having a plurality of commutator segments that should have same potential. An equalizer connected at one end to a commutator segment among the commutator segments where the commutator segment is in contact with a brush reaches a rear side of the iron core by passing through a slot positioned at a center of a magnetic pole of the rotating electrical machine and returns to the front side by passing through another slot positioned at a center of another magnetic pole so that the equalizer is connected at the other end to a commutator segment where the commutator segment is in contact with a brush of a same polarity as the firstly-mentioned brush.

9 Claims, 7 Drawing Sheets

(56) References Cited

FOREIGN PATENT DOCUMENTS

| | | | | |
|---|---|---|---|---|
| JP | 2003-169458 A | 6/2003 | | |
| JP | 2003169458 A | * | 6/2003 | |
| JP | 2005-269781 A | 9/2005 | | |
| JP | 2008-306912 A | 12/2008 | | |

* cited by examiner

ROTATING ELECTRICAL MACHINE HAVING SLOTS AT CENTER POSITIONS OF MAGNETIC POLES AND MANUFACTURING METHOD OF THE SAME

CROSS REFERENCE TO RELATED APPLICATIONS

This application is a National Stage of International Application No. PCT/JP2010/050639 filed Jan. 20, 2010, the contents of which are incorporated herein by reference in their entirety.

TECHNICAL FIELD

The present invention relates to a rotating electrical machine provided with equalizers electrically connecting commutator segments that should have the same potential and to a manufacturing method of the same.

BACKGROUND ART

There is disclosed a rotating electrical machine of a structure in which equalizers are passed through rotor slots of a rotating electrical machine, for example, in Patent Document 1 (Japanese Patent No. 3278402). In order to reduce vibrations and noises, an equalizer is connected between respective commutator segments that should have the same potential, and a current most readily flows through an equalizer connecting commutator segments in contact with brushes. Depending on positions of slots through which to wind equalizers connecting the commutator segments in contact with the brushes, an effect of equalizers, that is, an effect of reducing vibrations and noises (radial exciting force), is lowered when the equalizers are subjected to electromagnetic force. In Japanese Patent No. 3278402, however, no consideration is given to the positions of the slots through which to wind equalizers connecting the commutator segments in contact with the brushes.

RELATED ART DOCUMENT

Patent Document

Patent Document 1: Japanese Patent No. 3278402

SUMMARY OF THE INVENTION

Problem that the Invention is to Solve

The invention was devised to solve the problem as above and has an object to allow an effect of reducing vibrations and noises to be exerted to the fullest extent possible by passing equalizers through slots at center positions of magnetic poles and also by making resistance of the equalizers uniform.

Means for Solving the Problem

To achieve the object above, a rotating electrical machine of the invention includes a plurality of magnetic poles installed on a circumference and an armature provided oppositely to inner peripheries of the magnetic poles. The armature is formed of a shaft, an iron core fixed to the shaft and having a plurality of slots extending in an axial direction, an armature winding inserted into the slots, a commutator provided fixedly to the shaft on a front side of the iron core and having a plurality of commutator segments arrayed in a rotating direction of the shaft, and equalizers electrically connecting commutator segments of the commutator that should have same potential using conductive wires folded back by passing through the slots. It is configured in such a manner that an equalizer connected at one end to a commutator segment among the commutator segments at a position at which the commutator segment is in contact with a brush reaches a rear side of the iron core by passing through a slot positioned at a center of a magnetic pole and returns to the front side by passing through another slot positioned at a center of another magnetic pole so that the equalizer is connected at the other end to a commutator segment at a position at which the commutator segment is in contact with a brush of a same polarity as the firstly-mentioned brush.

A manufacturing method of a rotating electrical machine of the invention is a manufacturing method of a rotating electrical machine having a plurality of magnetic poles installed on a circumference and an armature provided oppositely to inner peripheries of the magnetic poles. The armature is formed of a shaft, an iron core fixed to the shaft and having a plurality of slots extending in an axial direction, an armature winding inserted into the slots, a commutator provided fixedly to the shaft on a front side of the iron core and having a plurality of commutator segments arrayed in a rotating direction of the shaft, and equalizers electrically connecting commutator segments that should have same potential using conductive wires folded back by passing through the slots. It is configured in such a manner that an equalizer is connected at one end to a commutator segment among the commutator segments at a position at which the commutator segment is in contact with a brush, extended to a rear side of the iron core by passing through a slot positioned at a center of a magnetic pole, and returned to the front side of the iron core by passing through a slot positioned at a center of another magnetic pole so that the equalizer is connected at the other end to a commutator segment at a position at which the commutator segment is in contact with a brush of a same polarity as the firstly-mentioned brush.

Advantages of the Invention

According to the invention, by passing an equalizer connected to the commutator segments in contact with the brushes through the slots positioned at the centers of the magnetic poles, an electromagnetic force induced by a current flowing through the equalizer can be reduced. It thus becomes possible to allow an effect of the equalizers to be fully exerted.

Also, according to the invention, because resistance of the equalizers can be made uniform, a variance of the electromagnetic forces induced by currents flowing through the equalizers can be suppressed. It thus becomes possible to allow an effect of the equalizers to be fully exerted.

In addition, because lapping of the equalizers at the coil end can be reduced, it becomes possible to prevent interference with the armature winding.

MODE FOR CARRYING OUT THE INVENTION

First Embodiment

Figure 1:
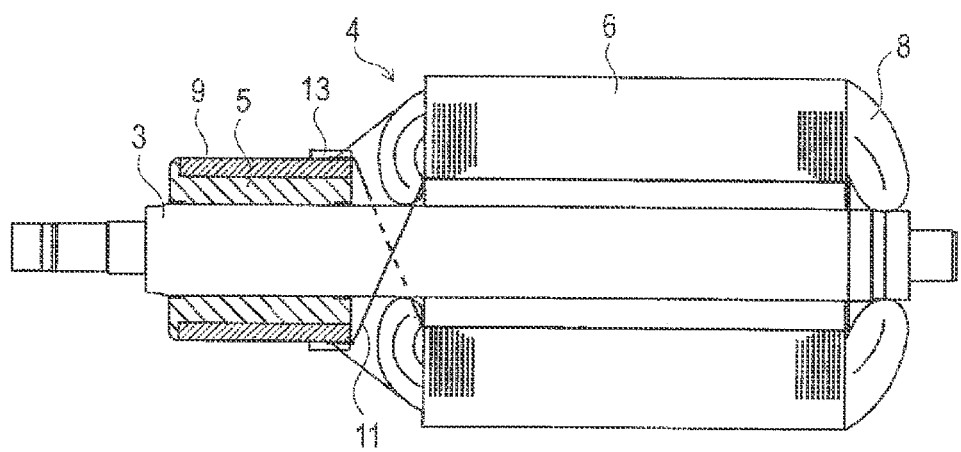
FIG. 1 is a sectional side view of a rotor in a rotating electrical machine according to a first embodiment of the invention.
Figure 2:
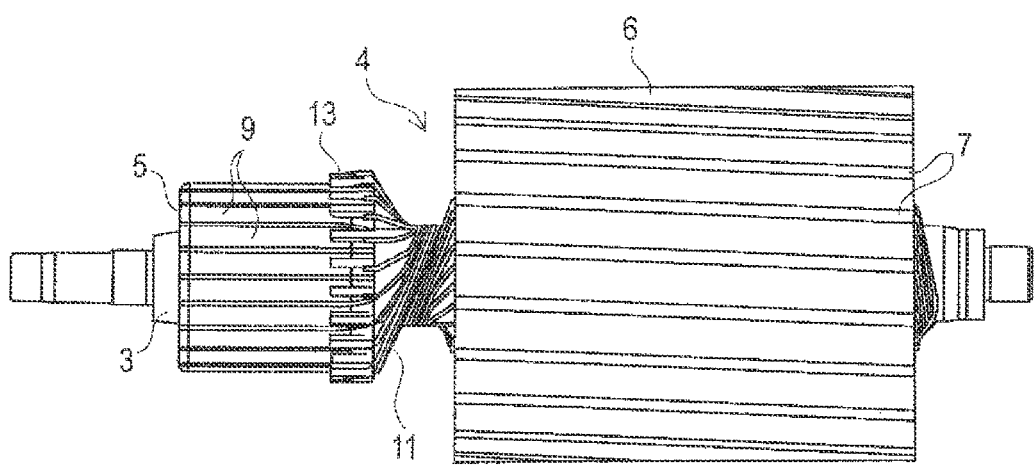
FIG. 2 is a side view of the rotor before windings are inserted therein in the rotating electrical machine according to the first embodiment of the invention.

As are shown in FIG. 1 through FIG. 4, a rotating electrical machine of the invention includes a cylindrical yoke 1, four magnetic poles 21, 22, 23, and 24 formed of permanent magnets made of ferrite and fixed inside the yoke 1 while being spaced apart in a circumferential direction, an armature 4 fixed to a shaft 3 oppositely to inner peripheries of the magnetic poles 21 through 24 in a rotatable manner, a commutator 5 provided fixedly to the shaft 3, and four brushes 31, 32, 33, and 34 installed to be in contact with the commutator 5 and 90 degrees apart in the circumferential direction.

The commutator 5 is fixed at an end of the shaft 3 and has 22 commutator segments 9Sg1 through Sg22 (see FIG. 4 in which numeral references Sg1 and Sg12 alone are shown and the rest is omitted) arrayed in the circumferential direction. The respective commutator segments 9 are provided with hooks 13 on a side closer to an iron core 6.

For equalizers 11 to electrically connect commutator segments 9 that should have the same potential, an equalizer 11 is retained by one of the hooks 13 provided to the commutator segments 9 and extends to a rear side of the iron core by passing through a slot of the iron core 6. Then, the equalizer 11 is folded back to return to a front side by passing through another slot of the iron core 6 and connected to a hook 13 of another commutator segment 9.

The armature 4 includes the iron core 6 having 22 slots 7S11 through S122 (see FIG. 4 in which numeral references S11, S16, S112, and S117 alone are shown and the rest is omitted) extending in an axial direction, and an armature winding 8 formed by winding a conductive wire formed of an enamel-coated copper wire through the slots 7 by a lap winding method.

Figure 3:
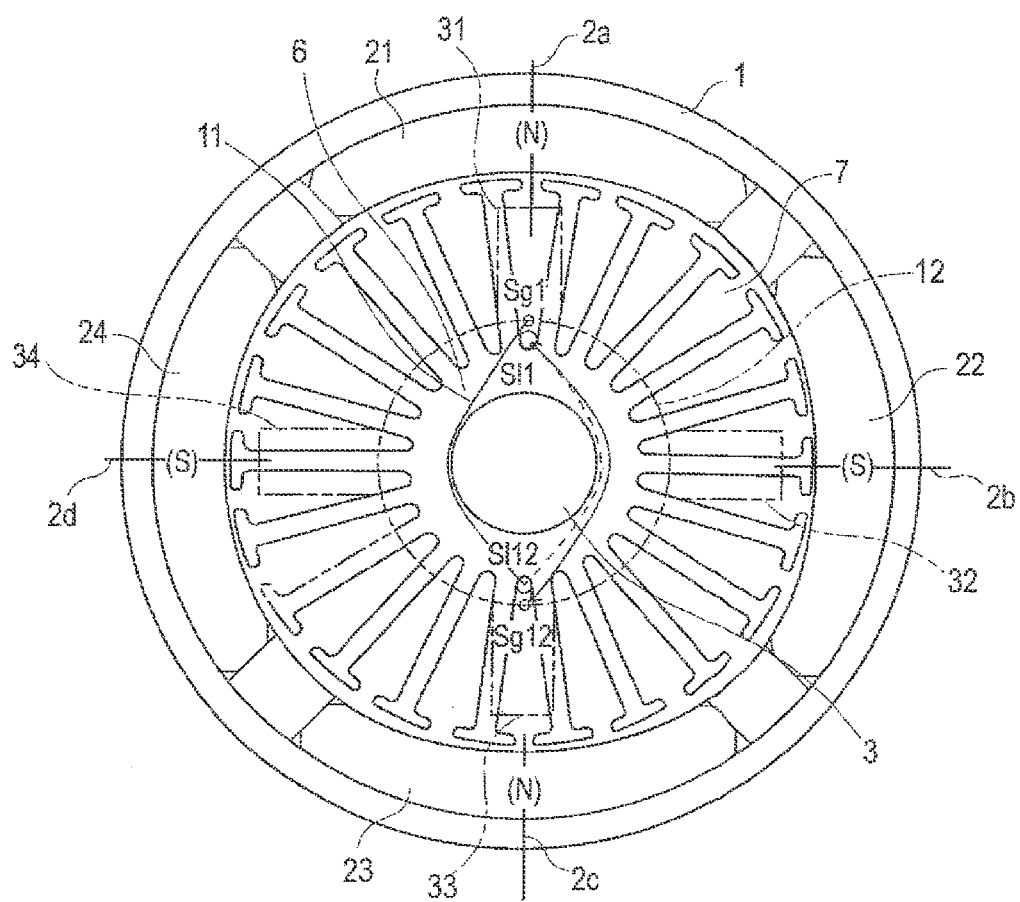
FIG. 3 is a view used to describe a relation between an iron core and an equalizer in the rotating electrical machine according to the first embodiment of the invention.

As is shown in FIG. 3, the four brushes 31 through 34 are installed, respectively, on center lines 2a, 2b, 2c, and 2d of the four magnetic poles 21, 22, 23, and 24, respectively, and are in contact with the commutator segments 9. In FIG. 3, an outer peripheral position of the commutator 5 is indicated by a chained line 12.

Figure 4:
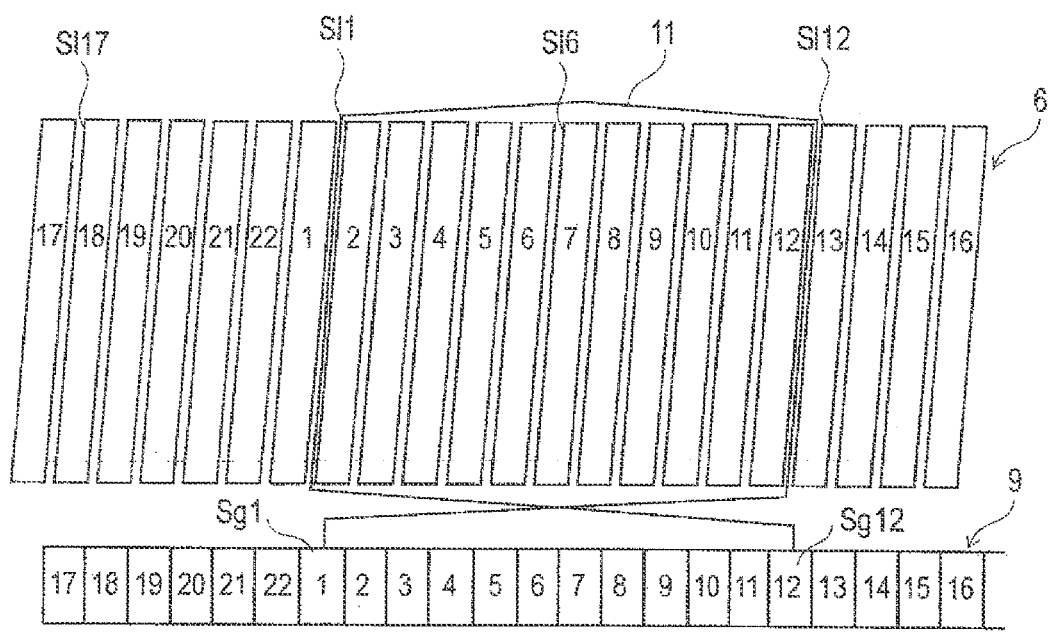
FIG. 4 is a winding diagram of the first embodiment.

A connection method of the equalizers 11 will now be described using FIG. 1, FIG. 3, and FIG. 4. A single continuous equalizer alone is shown in FIG. 1, FIG. 3, and FIG. 4 for ease of understanding of the connection method by avoiding a complicated illustration. It should be noted, however, that there are actually as many equalizers as needed for all the slots in the same positional relation. The equalizer 11 runs across the shaft 3 while one end thereof is stopped at the hook 13 of the commutator segment 9Sg1 and extends to the rear side of the iron core 6 by passing through the iron core slot 7S112 on a remotest side (180-degree opposite side) from the position of the commutator segment 9Sg1. Then, the equalizer 11 runs across the shaft 3 in the rear of the iron core 6 to return to the front side by passing through the slot 7S11 on the 180-degree opposite side to the slot 7S112 and stopped at the hook 13 of the commutator segment 9Sg12 on the 180-degree opposite side to the commutator segment 9Sg1. Consequently, the commutator segments 9Sg1 and Sg12 are connected so as to have the same potential.

The slots 7S11 and S112 are slots positioned, respectively, at portions of the center lines 2a and 2c of the magnetic poles 21 and 23, respectively, when the commutator segments 9Sg1 and Sg12 are in contact, respectively, with the brushes 31 and 33 on the center lines of the magnetic poles 21 and 23, respectively. In other words, the equalizer 11 running from the commutator segment 9Sg1 to the commutator segment 9Sg12 passes through the slots 7S11 and S112 positioned, respectively, at the portions of the center lines 2a and 2c of the magnetic poles 21 and 23, respectively, when the commutator segment 9Sg1 and the commutator segment 9Sg12 are in contact with the brushes.

Likewise, the following equalizer 11 from the commutator segment 9Sg2 runs across the shaft 3 while one end thereof is stopped at the hook 13 of the commutator segment 9Sg2 (reference numeral Sg2 is omitted in the drawing) and extends to the rear side of the iron core 6 by passing through the iron core slot 7S113 (reference numeral S113 is omitted in the drawing) on a remotest side (180-degree opposite side) from the position of the commutator segment 9Sg2. Then, the equalizer 11 runs across the shaft 3 in the rear of the iron core 6 to return to the front side by passing through the slot 7S12 (reference numeral S12 is omitted in the drawing) on the 180-degree opposite side to the slot 7S113 and stopped at the hook 13 of the commutator segment 9Sg13 on the 180-degree opposite side to the commutator segment 9Sg2. Consequently, the equalizer 11 connects the commutator segments 9Sg2 and Sg13.

The slots 7S12 and S113 are slots positioned, respectively, at portions of the center lines 2a and 2c of the magnetic poles 21 and 23, respectively, when the commutator segments 9Sg2 and Sg13 are in contact, respectively, with the brushes 31 and 33 on the center lines of the magnetic poles 21 and 23, respectively.

In this instance, too, the equalizer 11 running from the commutator segment 9Sg2 to the commutator segment 9Sg13 passes through the slots 7S12 and S113 respectively positioned on the center lines the magnetic poles when the commutator segment 9Sg2 and the commutator segment 9Sg13 are in contact with the brushes.

Thereafter, all the commutator segments 9 are connected to the corresponding ones by the equalizers 11 in the same manner.

The equalizers 11 run across the shaft 3 and are therefore wound around a part of the shaft 3. In this instance, it is configured in such a manner that the respective equalizers 11 are wound in the same winding direction. Because the equalizers 11 are wound around the shaft 3, heat generated in the equalizers 11 is released through the shaft 3.

As has been described above, this embodiment has a structure in which an equalizer connected to the commutator segments in contact with the brushes and hence through which a current flows most readily is fit in the slots coming in the center portions of the magnetic poles where the equalizer is least susceptible to magnetic force. Owing to this structure, it becomes possible to allow an effect of the equalizers, that is, an effect of reducing vibrations and noises of the rotor, to be fully exerted. Conversely, in a case where an equalizer connected to the commutator segments in contact with the brushes and hence through which a current flows most readily is fit in slots each between one magnetic pole and another magnetic pole, the rotor is subjected to electromagnetic force induced by a current flowing through the equalizer and generates considerable vibrations and large noises.

Second Embodiment

Figure 5:
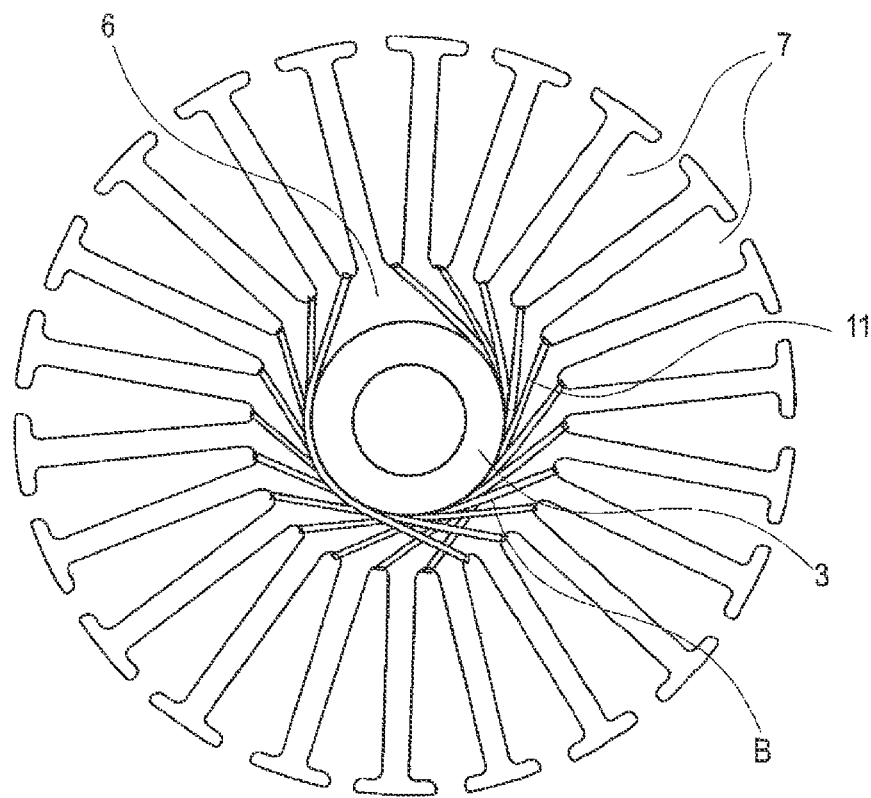
FIG. 5 is a rear view showing a relation between the iron core and the equalizers in the rotating electrical machine of the first embodiment.

Another example of connecting the equalizers 11 will be described. The connection method described in the first embodiment above adopts a connection method without skipping the commutator segments and the slots, so that connections are made first in a route of commutator segment 9Sg1-slot 7S112-slot 7S11-commutator segment 9Sg12 and then in a route of adjacent commutator segment 9Sg2-slot 7S113-slot 7S12-commutator segment 9Sg13, and so on. Moreover, the winding directions of the equalizers 11 around the shaft 3 are the same. Hence, regarding a relation between the rotor core rear and the equalizers, as is illustrated in a portion indicated by a capital B in FIG. 5, lapping of the equalizers is biased and lengths of the equalizers 11 become inhomogeneous. Accordingly, resistance of the equalizers become inhomogeneous, too. Also, there is a concern that windability is deteriorated as a lapped portion of the equalizers at a coil end interferes with the armature winding.

According to an equalizer connection method of the second embodiment, an equalizer is wound first in a route of commutator segment 9Sg1-slot 7S112-slot 7S11-commutator segment 9Sg12, and then, by skipping one commutator segment, another equalizer is wound in a route of commutator 9Sg3-slot 7S114-slot 7S13-commutator segment 9Sg14. Further, by skipping one commutator segment, still another equalizer is wound in a route of commutator 9Sg5-slot 7S116-slot 7S15-commutator segment 9Sg16. Thereafter, equalizers are connected by skipping one commutator segment at a time in the same manner and as many equalizers as needed for all the slots are eventually connected. The equalizers are wound in the same connection direction with respect to the shaft 3.

Figure 6:
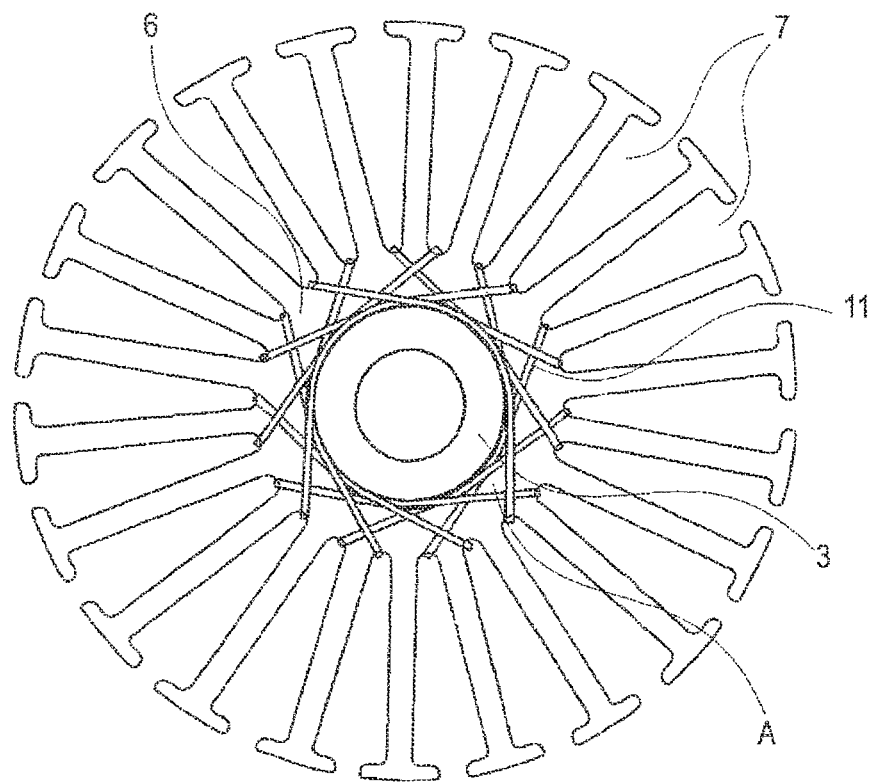
FIG. 6 is a rear view showing a relation between an iron core and equalizers in a rotating electrical machine according to a second embodiment of the invention.

According to this connection method, regarding a relation between the rotor core rear and the equalizers, as is illustrated in a portion indicated by a capital A in FIG. 6, the equalizers are installed uniformly around the shaft 3. Accordingly, lengths of the equalizers 11 become homogeneous and it becomes possible to make resistance of the equalizers more uniform.

Third Embodiment

Figure 7:
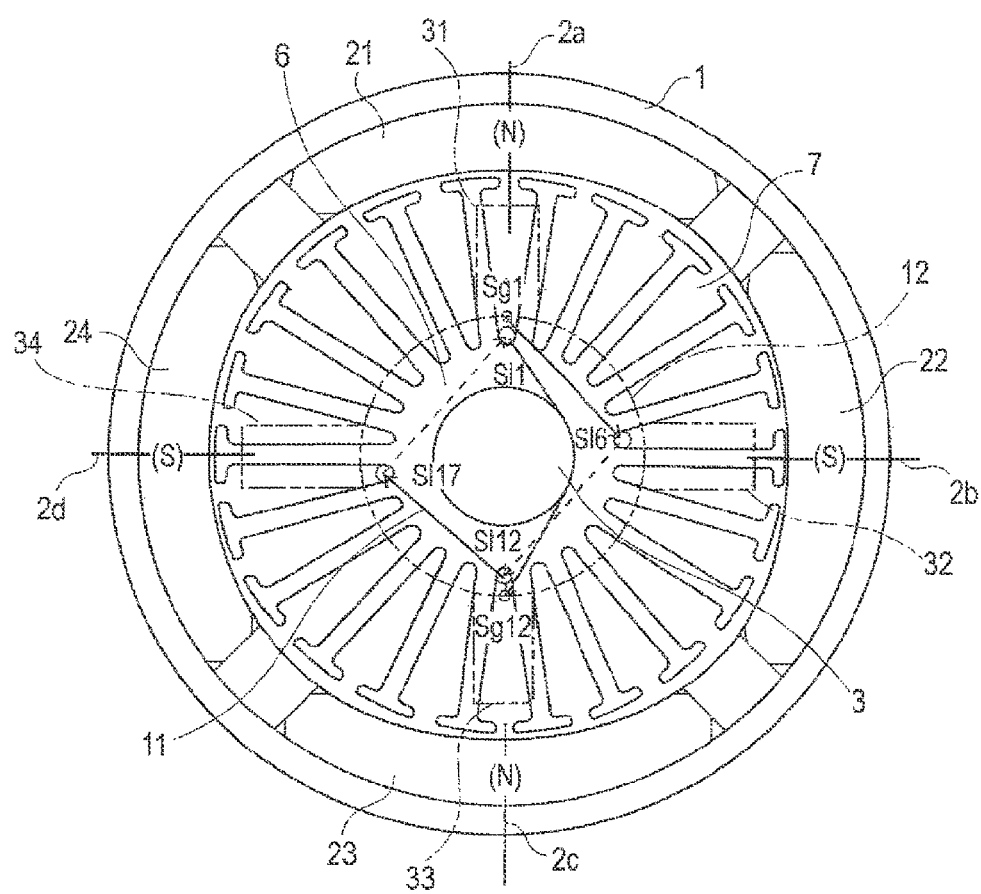
FIG. 7 is a view used to describe a relation between an iron core and equalizers in a rotating electrical machine according to a third embodiment of the invention.

FIG. 7 is a view used to describe an equalizer connection method for a rotating electrical machine of a third embodiment. According to the connection method of the equalizers 11 in the third embodiment, when the commutator segment 9Sg1 is in contact with the brush 31, the equalizer 11 connected to the commutator segment 9Sg1 extends to the rear side of the iron core 6 by passing through the slot 7S16 positioned at the portion of the center line 2b of the adjacent magnetic pole 22. Then, the equalizer 11 further extends to the front side of the iron core 6 by passing through the slot 7S112 positioned at the portion of the center line 2c of the adjacent magnetic pole 23. The equalizer 11 still further runs round to the rear side of the iron core 6 by passing through the slot 7S117 positioned at the portion of the center line 2d of the magnetic pole 24. Furthermore, the equalizer 11 comes out to the front side of the iron core 6 by passing through the slot 7S11 positioned at the portion of the center line 2a of the magnetic pole 21 and is connected to the commutator segment 9Sg12 in contact with the brush 33 by running across the shaft 3. In other words, an equalizer 11 connected to one commutator segment is connected to the other commutator segment after the equalizer 11 is folded back successively by passing through slots positioned at center portions of the adjacent magnetic poles. The equalizer 11 connects the commutator segments 9Sg1 and Sg12 and it is configured in such a manner that when the commutator segments 9Sg1 and Sg12 are in contact with the brushes 31 and 33, respectively, all of the slots 7S11, S16, S112, and S117 through which to pass the equalizer 11 are positioned at the center line portions of the respective magnetic poles. Thereafter, all the 11 equalizers are wound in the same procedure.

According to the third embodiment, in addition to the structure in which an equalizer connected to the commutator segments in contact with the brushes and hence through which a current flows most readily is fit in the slots coming in the center portions of the magnetic poles where the equalizer is least susceptible to magnetic force, all the electromagnetic forces that are generated only slightly act in the same rotating direction. It thus becomes possible to allow an effect of the equalizers, that is, an effect of reducing vibrations and noises of the rotor, to be fully exerted. Conversely, in a case where an equalizer connected to the commutator segments in contact with the brushes and hence through which a current flows most readily is fit in slots each between one magnetic pole and another magnetic pole, the rotor is subjected to electromagnetic force induced by a current flowing through the equalizer and generates considerable vibrations and large noises.

The invention claimed is:

1. A rotating electrical machine including a plurality of magnetic poles installed on a circumference and an armature provided oppositely to inner peripheries of the magnetic poles, the armature comprising a shaft, an iron core fixed to the shaft and having a plurality of slots extending in an axial direction, an armature winding inserted into the slots, a commutator provided fixedly to the shaft on a front side of the iron core and having a plurality of commutator segments arrayed in a rotating direction of the shaft, and an equalizer electrically connecting the commutator segments that are configured to have a same potential using conductive wires folded back by passing through the slots, the rotating electrical machine being characterized in that:

the equalizer connected at one end to a commutator segment among the commutator segments at a position at which the commutator segment is in contact with a first brush reaches a back side of the iron core by passing through a slot positioned at a center of one of the magnetic poles and returns to the front side by passing through a slot positioned at a center of another of the magnetic poles so that the equalizer is connected at the other end to another commutator segment among the commutator segments at a position at which the other commutator segment is in contact with a second brush of a same polarity as the first brush.

2. The rotating electrical machine according to claim 1, characterized in that:

the equalizer is folded back by passing through slots positioned at centers of magnet poles on a remotest side from the respective two commutator segments to which the equalizer is connected.

3. The rotating electrical machine according to claim 1, characterized in that:

the equalizer connected to one commutator segment is connected to the other commutator segment after the equalizer is successively folded back by passing through slots positioned at centers of adjacent magnetic poles.

4. The rotating electrical machine according to claim 1, further comprising a plurality of the equalizers, wherein all of the equalizers run across the shaft in a same direction.

5. A manufacturing method of a rotating electrical machine including a plurality of magnetic poles installed on a circumference and an armature provided oppositely to inner peripheries of the magnetic poles, the armature comprising a shaft, an iron core fixed to the shaft and having a plurality of slots extending in an axial direction, an armature winding inserted into the slots, a commutator provided fixedly to the shaft on a front side of the iron core and having a plurality of commutator segments arrayed in a rotating direction of the shaft, and an equalizer electrically connecting the commutator segments that are configured to have a same potential using conductive wires folded back by passing through the slots, the manufacturing method being characterized in that:

the equalizer is connected at one end to a commutator segment among the commutator segments at a position at which the commutator segment is in contact with a first brush, extended to a rear side of the iron core by passing through a slot positioned at a center of one of the magnetic poles, and returned to the front side bypassing through a slot positioned at a center line portion of another of the magnetic poles so that the equalizer is connected at the other end to another of the commutator segments among the commutator segments at a position at which the other commutator segment is in contact with a second brush of a same polarity as the first brush.

6. The manufacturing method of a rotating electrical machine according to claim 5, characterized in that:

the equalizer is connected to the commutator segments and inserted into the slots by skipping one commutator segment and one slot at a time.

7. The manufacturing method of a rotating electrical machine according to claim 5, characterized in that:

the equalizer is folded back by passing through slots positioned at centers of magnet poles on a remotest side from the respective two commutator segments to which the equalizer is connected.

8. The manufacturing method of a rotating electrical machine according to claim 5, characterized in that:

the equalizer connected to the one commutator segment is connected to the other commutator segment of the same polarity after the equalizer is successively folded back by passing through slots positioned at centers of adjacent magnetic poles.

9. The manufacturing method of a rotating electrical machine according to claim 5, further comprising a plurality of the equalizers, wherein all of the equalizers run across the shaft in a same direction.

\* \* \* \* \*